United States Patent
Yamamoto

(10) Patent No.: US 12,519,282 B2
(45) Date of Patent: Jan. 6, 2026

(54) LIGHT-EMITTING APPARATUS AND MANUFACTURING METHOD THEREOF

(71) Applicant: SONY SEMICONDUCTOR SOLUTIONS CORPORATION, Kanagawa (JP)

(72) Inventor: Atsushi Yamamoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 777 days.

(21) Appl. No.: 17/792,010

(22) PCT Filed: Dec. 7, 2020

(86) PCT No.: PCT/JP2020/045495
§ 371 (c)(1),
(2) Date: Jul. 11, 2022

(87) PCT Pub. No.: WO2021/149374
PCT Pub. Date: Jul. 29, 2021

(65) Prior Publication Data
US 2023/0025879 A1    Jan. 26, 2023

(30) Foreign Application Priority Data
Jan. 20, 2020   (JP) ................ 2020-006912

(51) Int. Cl.
*H01S 5/022*   (2021.01)
*H01S 5/02*    (2006.01)
(Continued)

(52) U.S. Cl.
CPC ........ *H01S 5/02253* (2021.01); *H01S 5/0206* (2013.01); *H01S 5/0261* (2013.01); *H04N 23/56* (2023.01); *H04N 23/74* (2023.01)

(58) Field of Classification Search
CPC .................................. H01S 5/18305
See application file for complete search history.

(56) References Cited

U.S. PATENT DOCUMENTS

2012/0249972 A1* 10/2012 Kurosaki ............ G03B 21/208
                                                         362/244
2016/0254638 A1*  9/2016 Chen ................... H04N 13/254
                                                         362/11
(Continued)

FOREIGN PATENT DOCUMENTS

CN       102736383 A     10/2012
CN       103576314 A      2/2014
(Continued)

OTHER PUBLICATIONS

International Search Report and Written Opinion prepared by the Japan Patent Office on Jan. 19, 2021, for International Application No. PCT/JP2020/045495, 3 pgs.

*Primary Examiner* — Minsun O Harvey
*Assistant Examiner* — Stephen Sutton Kotter
(74) *Attorney, Agent, or Firm* — SHERIDAN ROSS P.C.

(57) ABSTRACT

To provide a light-emitting apparatus capable of suitably shaping light from a plurality of light-emitting elements and a manufacturing method thereof. A light-emitting apparatus according to the present disclosure includes: a substrate; a plurality of light-emitting elements which are provided on a side of a first surface of the substrate; a plurality of first lenses which are provided on a side of a second surface of the substrate and on which light emitted from the plurality of light-emitting elements is incident; and a second lens on which light having passed through the plurality of first lenses is incident, wherein a shape or an arrangement of the plurality of first lenses changes in accordance with a distance from an optical center of the second lens.

20 Claims, 17 Drawing Sheets

(51) Int. Cl.
  *H01S 5/02253*  (2021.01)
  *H01S 5/026*  (2006.01)
  *H04N 23/56*  (2023.01)
  *H04N 23/74*  (2023.01)

(56) References Cited

U.S. PATENT DOCUMENTS

| | | |
|---|---|---|
| 2017/0363941 A1 | 12/2017 | Sugiyama |
| 2020/0303896 A1* | 9/2020 | Ohta ..................... B25J 19/022 |
| 2020/0350744 A1* | 11/2020 | Gerlach .............. H01S 5/18361 |
| 2021/0013703 A1* | 1/2021 | Numata ................ H01S 3/1643 |

FOREIGN PATENT DOCUMENTS

| | | |
|---|---|---|
| JP | H10-244702 | 9/1998 |
| JP | 2004-526194 | 8/2004 |
| JP | 2005070107 A | 3/2005 |
| JP | 2009-217218 | 9/2009 |
| JP | 2012-215633 | 11/2012 |
| JP | 2014092600 A | 5/2014 |
| JP | 2017-227860 | 12/2017 |
| JP | 2018-032650 | 3/2018 |
| JP | 2019-192888 | 10/2019 |
| WO | WO-2019043102 A1 | 3/2019 |

\* cited by examiner

A

B

LIGHT-EMITTING APPARATUS AND MANUFACTURING METHOD THEREOF

CROSS REFERENCE TO RELATED APPLICATIONS

This application is a national stage application under 35 U.S.C. 371 and claims the benefit of PCT Application No. PCT/JP2020/045495, having an international filing date of 7 Dec. 2020, which designated the United States, which PCT application claimed the benefit of Japanese Patent Application No. 2020-006912, filed 20 Jan. 2020, the entire disclosures of each of which are incorporated herein by reference.

TECHNICAL FIELD

The present disclosure relates to a light-emitting apparatus and to a manufacturing method thereof.

BACKGROUND ART

Surface-emitting lasers such as a VCSEL (Vertical Cavity Surface Emitting Laser) are known as a type of semiconductor laser. Generally, in a light-emitting apparatus using a surface-emitting laser, a plurality of light-emitting elements are provided in a two-dimensional array pattern on a front surface or a rear surface of a substrate.

CITATION LIST

Patent Literature

[PTL 1]
JP 2004-526194 T

SUMMARY

Technical Problem

In a light-emitting apparatus such as that described above, for example, light emitted from the plurality of light-emitting elements must be shaped into light with a desired shape (for example, parallel light). In this case, determining a method of shaping light in a suitable manner is an important issue.

In consideration thereof, the present disclosure provides a light-emitting apparatus capable of suitably shaping light from a plurality of light-emitting elements and a manufacturing method thereof.

Solution to Problem

A light-emitting apparatus according to a first aspect of the present disclosure includes: a substrate; a plurality of light-emitting elements which are provided on a side of a first surface of the substrate; a plurality of first lenses which are provided on a side of a second surface of the substrate and on which light emitted from the plurality of light-emitting elements is incident; and a second lens on which light having passed through the plurality of first lenses is incident, wherein a shape or an arrangement of the plurality of first lenses changes in accordance with a distance from an optical center of the second lens. Accordingly, light from the plurality of light-emitting elements can be suitably shaped and, for example, light can be suitably collimated by the plurality of first lenses and the second lens.

In addition, in the first aspect, the plurality of first lenses may be provided on the second surface of the substrate as a part of the substrate. Accordingly, the first lenses can be readily formed by machining of the substrate.

Furthermore, in the first aspect, the plurality of first lenses may include at least any of a concave lens, a convex lens, and a binary lens. Accordingly, light can be shaped with an appropriate lens which is suitable for a purpose of use of the light.

Moreover, in the first aspect, a radius of curvature of the plurality of first lenses may be increased or reduced in accordance with a distance from the optical center of the second lens. Accordingly, light can be suitably shaped by adjusting the radius of curvature of each of the first lenses.

In addition, in the first aspect, a pitch between the plurality of first lenses may be increased or reduced in accordance with a distance from the optical center of the second lens. Accordingly, light can be suitably shaped by adjusting the pitch between the first lenses.

Furthermore, the light-emitting apparatus according to the first aspect may further include an antireflective film provided on a surface of the plurality of first lenses. Accordingly, light can be prevented from being reflected by the first lenses.

Moreover, the light-emitting apparatus according to the first aspect may further include an inorganic film provided on the second surface of the substrate between the plurality of first lenses. Accordingly, for example, light can be prevented from passing through portions other than the first lenses.

In addition, in the first aspect, the substrate may be a semiconductor substrate containing gallium (Ga) and arsenic (As). Accordingly, a substrate suitable for a light-emitting apparatus can be provided.

Furthermore, in the first aspect, light emitted from the plurality of light-emitting elements may be transmitted inside the substrate from the first surface to the second surface and may be incident on the plurality of first lenses. Accordingly, a structure can be realized in which light is transmitted through the substrate and emitted from the light-emitting apparatus.

Moreover, in the first aspect, the first surface of the substrate may be a front surface of the substrate and the second surface of the substrate may be a rear surface of the substrate. Accordingly, a backside illumination-type light-emitting apparatus can be provided.

In addition, the light-emitting apparatus according to the first aspect may further include a drive apparatus which is provided on the side of the first surface of the substrate via the plurality of light-emitting elements and which is configured to drive the plurality of light-emitting elements. Accordingly, for example, the substrate provided with the light-emitting elements can be loaded onto the drive apparatus.

Furthermore, in the first aspect, the drive apparatus may be configured to drive the plurality of light-emitting elements on an individual basis. Accordingly, light emitted from the plurality of light-emitting elements can be controlled more precisely.

A manufacturing method of a light-emitting apparatus according to a second aspect of the present disclosure includes the steps of; forming a plurality of light-emitting elements on a side of a first surface of a substrate; forming a plurality of first lenses on which light emitted from the plurality of light-emitting elements is incident on a side of a second surface of the substrate; and arranging a second lens on which light having passed through the plurality of first lenses is incident, wherein a shape or an arrangement of the plurality of first lenses is set so as to change in accordance with a distance from an optical center of the second lens. Accordingly, light from the plurality of light-emitting elements can be suitably shaped and, for example, light can be suitably collimated by the plurality of first lenses and the second lens.

In addition, in the second aspect, the plurality of first lenses may be formed as a part of the substrate by machining the second surface of the substrate. Accordingly, the first lenses can be readily formed by machining of the substrate.

Furthermore, in the second aspect, the plurality of first lenses may include at least any of a concave lens, a convex lens, and a binary lens. Accordingly, light can be shaped with an appropriate lens which is suitable for a purpose of use of the light.

Moreover, in the second aspect, the concave lens may be formed by forming a convex portion on the second surface of the substrate and machining the convex portion into a concave portion. Accordingly, the concave lens can be formed by machining from the convex portion to the concave portion.

Moreover, in the second aspect, the convex portion may be formed by forming a resist film on the second surface of the substrate, patterning the resist film, baking the patterned resist film, and transferring a pattern of the baked resist film onto the substrate. Accordingly, a convex portion which enables a concave lens to be formed can be formed through machining of the resist film.

In addition, in the second aspect, the concave portion may be formed by forming a mask layer on the convex portion, exposing the convex portion from the mask layer by etching the mask layer, and further etching the mask layer together with the convex portion. Accordingly, a concave portion can be readily formed from a convex portion.

Furthermore, in the second aspect, the convex lens may be formed by forming a convex portion on the second surface of the substrate. Accordingly, for example, the convex lens can be formed by a small number of steps.

Moreover, in the second aspect, the convex portion may be formed by forming a resist film on the second surface of the substrate, patterning the resist film, baking the patterned resist film, and transferring a pattern of the baked resist film onto the substrate. Accordingly, the convex lens can be formed through machining of a resist film.

DESCRIPTION OF EMBODIMENTS

Hereinafter, embodiments of the present invention will be described with reference to drawings.

First Embodiment

Figure 1:
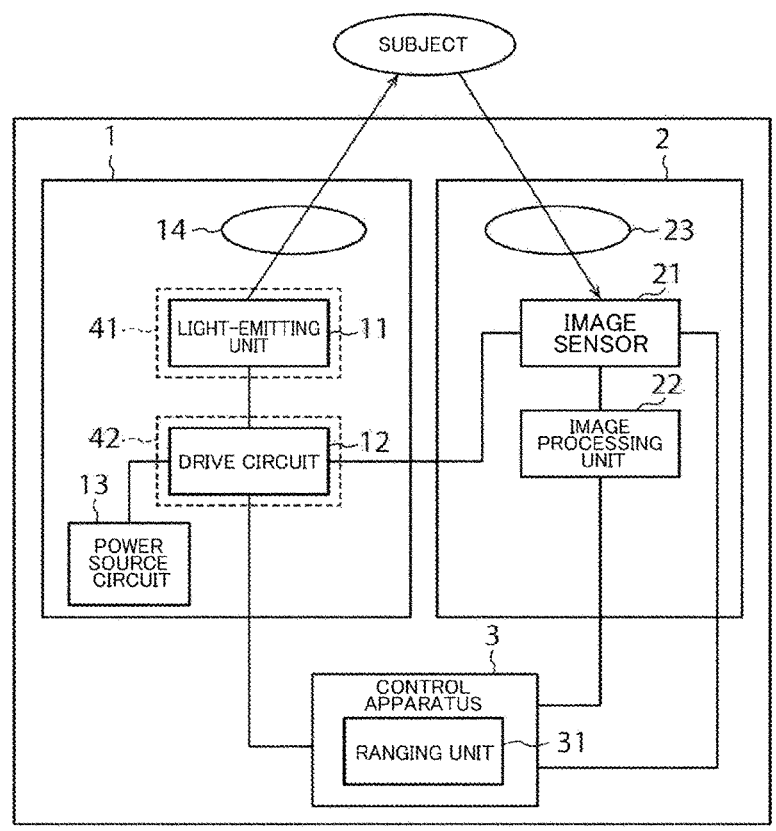
FIG. 1 is a block diagram showing a configuration of a ranging apparatus according to a first embodiment.

FIG. 1 is a block diagram showing a configuration of a ranging apparatus according to a first embodiment.

The ranging apparatus shown in FIG. 1 includes a light-emitting apparatus 1, an imaging apparatus 2, and a control apparatus 3. The ranging apparatus shown in FIG. 1 irradiates a subject with light emitted from the light-emitting apparatus 1, images the subject by receiving, with the imaging apparatus 2, light reflected by the subject, and measures (calculates) a distance to the subject with the control apparatus 3 using an image signal output from the imaging apparatus 2. The light-emitting apparatus 1 functions as a light source used when the imaging apparatus 2 images a subject.

The light-emitting apparatus 1 includes a light-emitting unit 11, a drive circuit 12, a power source circuit 13, and a light-emitting side optical system 14. The imaging apparatus 2 includes an image sensor 21, an image processing unit 22, and an imaging-side optical system 23. The control apparatus 3 includes a ranging unit 31.

The light-emitting unit 11 emits laser light with which the subject is to be irradiated. As will be described later, the light-emitting unit 11 according to the present embodiment includes a plurality of light-emitting elements arranged in a two-dimensional array pattern and each light-emitting element has a VCSEL structure. The subject is to be irradiated with light emitted from the light-emitting elements. In addition, the light-emitting unit 11 according to the present embodiment is provided inside a chip referred to as an LD (Laser Diode) chip 41.

The drive circuit 12 is an electrical circuit for driving the light-emitting unit 11. The power source circuit 13 is an electrical circuit for generating power supply voltage of the drive circuit 12. For example, the ranging apparatus according to the present embodiment generates power supply voltage with the power source circuit 13 from input voltage supplied from a battery inside the ranging apparatus and drives the light-emitting unit 11 with the drive circuit 12 using the power supply voltage. In addition, the drive circuit 12 according to the present embodiment is provided inside a substrate referred to as an LDD (Laser Diode Driver) substrate 42.

The light-emitting side optical system 14 includes various optical elements and irradiates the subject with light from the light-emitting unit 11 via the optical elements. In a similar manner, the imaging-side optical system 23 includes various optical elements and receives light from the subject via the optical elements.

The image sensor 21 receives light from the subject via the imaging-side optical system 23 and converts the light into an electric signal by photoelectric conversion. For example, the image sensor 21 is a CCD (Charge Coupled Device) sensor or a CMOS (Complementary Metal Oxide Semiconductor) sensor. The image sensor 21 according to the present embodiment converts the electronic signal described above into a digital signal from an analog signal by A/D (Analog to Digital) conversion and outputs an image signal as a digital signal to the image processing unit 22. In addition, the image sensor 21 according to the present embodiment outputs a frame synchronization signal to the drive circuit 12 and, based on the frame synchronization signal, the drive circuit 12 causes the light-emitting unit 11 to emit light at a timing in accordance with a frame period in the image sensor 21.

The image processing unit 22 performs various types of image processing on the image signal output from the image sensor 21. For example, the image processing unit 22 includes an image processing processor such as a DSP (Digital Signal Processor).

The control apparatus 3 controls various operations of the ranging apparatus shown in FIG. 1 such as a light emission operation of the light-emitting apparatus 1 and an imaging operation of the imaging apparatus 2. For example, the control apparatus 3 includes a CPU (Central Processing Unit), a ROM (Read Only Memory), a RAM (Random Access Memory), and the like.

The ranging unit 31 measures a distance to the subject based on an image signal which is output from the image sensor 21 and on which image processing has been performed by the image processing unit 22. As a ranging method, for example, the ranging unit 31 adopts an STL (Structured Light) method or a ToF (Time of Flight) method. The ranging unit 31 may further specify a three-dimensional shape of the subject by measuring, based on the image signal described above, a distance between the ranging apparatus and the subject for each portion of the subject.

Figure 2:
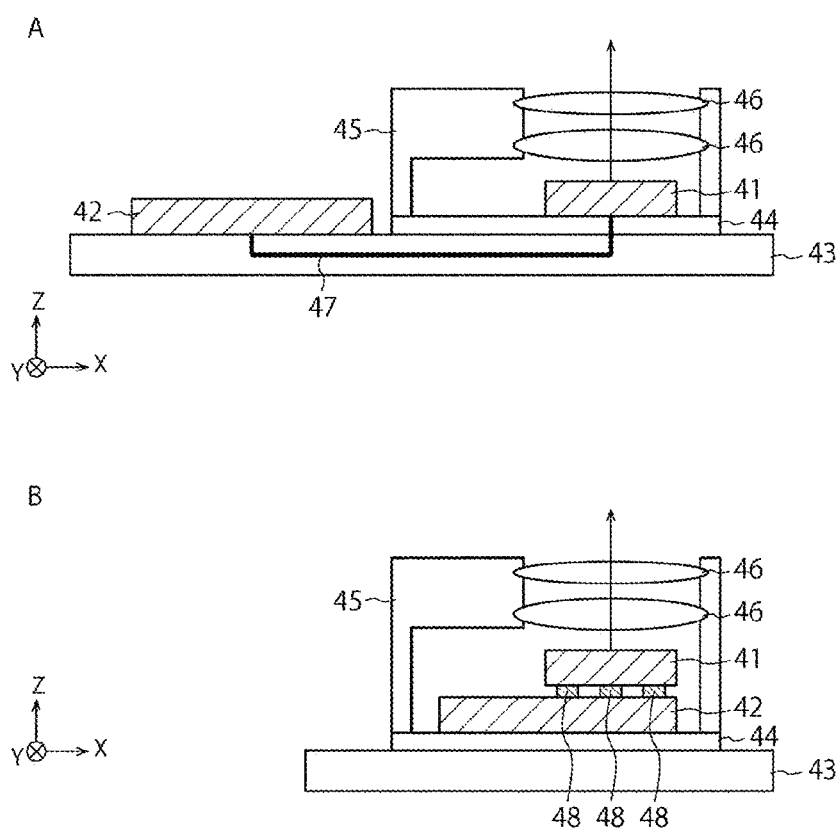
FIG. 2 is a sectional view showing an example of a structure of the ranging apparatus according to the first embodiment.

FIG. 2 is a sectional view showing an example of a structure of the ranging apparatus according to the first embodiment.

A in FIG. 2 shows a first example of the structure of the ranging apparatus according to the first embodiment. The ranging apparatus according to the example includes the LD chip 41 and the LDD substrate 42 described above, a mounting substrate 43, a heat dissipation substrate 44, a correcting lens holding unit 45, one or more correcting lenses 46, and wiring 47.

A in FIG. 2 shows an X axis, a Y axis, and a Z axis which are perpendicular to each other. An X direction and a Y direction correspond to a lateral direction (horizontal direction) and a Z direction corresponds to a longitudinal direction (a perpendicular direction). In addition, a +Z direction corresponds to an upward direction and a −Z direction corresponds to a downward direction. The −Z direction may strictly coincide with the direction of gravitational force or may not strictly coincide with the direction of gravitational force.

The LD chip 41 is arranged on the mounting substrate 43 via the heat dissipation substrate 44 and the LDD substrate 42 is also arranged on the mounting substrate 43. The mounting substrate 43 is, for example, a printed circuit board. The image sensor 21 and the image processing unit 22 shown in FIG. 1 are also arranged on the mounting substrate 43 according to the present embodiment. The heat dissipation substrate 44 is, for example, a ceramic substrate such as an AlN (aluminum nitride) substrate.

The correcting lens holding unit 45 is arranged on the heat dissipation substrate 44 so as to surround the LD chip 41 and holds one or more correcting lenses 46 above the LD chip 41. The correcting lenses 46 are included in the light-emitting side optical system 14 (FIG. 1) described above. Light emitted from the light-emitting unit 11 (FIG. 1) inside the LD chip 41 is corrected by the correcting lenses 46 and, subsequently, the subject (FIG. 1) is irradiated with the corrected light. As an example, A in FIG. 2 shows two correcting lenses 46 held by the correcting lens holding unit 45.

The wiring 47 is provided on a front surface and a rear surface of the mounting substrate 41, provided inside the mounting substrate 41, and the like and electrically connects the LD chip 41 and the LDD substrate 42 to each other. The wiring 47 is, for example, printed wiring which is provided on the front surface and the rear surface of the mounting substrate 41 or via wiring which penetrates the mounting substrate 41. The wiring 47 according to the present embodiment further passes through the inside or near the heat dissipation substrate 44.

B in FIG. 2 shows a second example of the structure of the ranging apparatus according to the first embodiment. While the ranging apparatus according to the second example includes the same components as the ranging apparatus according to the first example, the ranging apparatus according to the second example includes a bump 48 instead of the wiring 47.

In B in FIG. 2, the LDD substrate 42 is arranged on the heat dissipation substrate 44 and the LD chip 41 is arranged on the LDD substrate 42. By arranging the LD chip 41 on the LDD substrate 42 in this manner, the mounting substrate 44 can be downsized as compared to the first example. In B in FIG. 2, the LD chip 41 is arranged on the LDD substrate 42 via the bump 48 and the LD chip 41 is electrically connected to the LDD substrate 42 by the bump 48.

Hereinafter, the ranging apparatus according to the present embodiment will be described on the assumption that the ranging apparatus has the structure according to the second example shown in B in FIG. 2. However, with the exception of an explanation of structures specific to the second example, the following explanation is also applicable to a ranging apparatus having the structure according to the first example.

Figure 3:
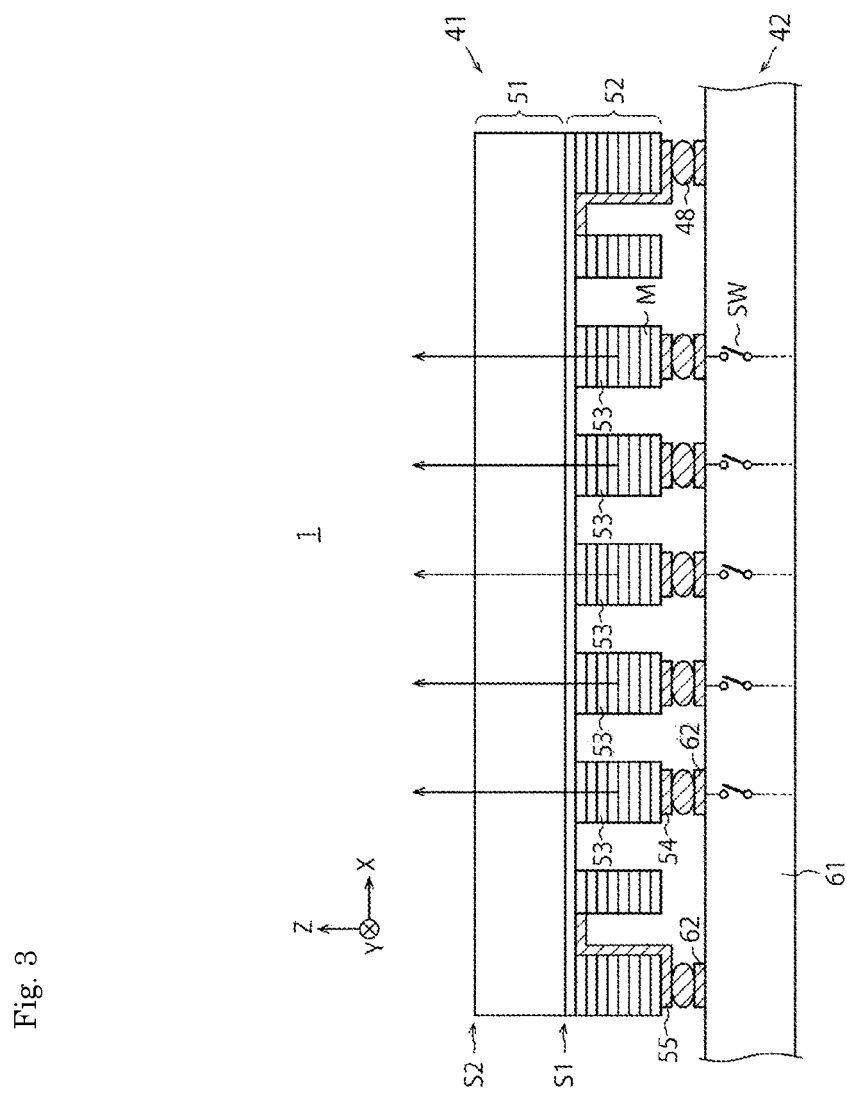
FIG. 3 is a sectional view showing the structure of the ranging apparatus shown in B in FIG. 2.

FIG. 3 is a sectional view showing the structure of the ranging apparatus shown in B in FIG. 2.

FIG. 3 shows cross sections of the LD chip 41 and the LDD substrate 42 inside the light-emitting apparatus 1. As shown in FIG. 3, the LD chip 41 includes a substrate 51, a laminated film 52, a plurality of light-emitting elements 53, a plurality of anode electrodes 54, and a plurality of cathode electrodes 55. In addition, the LDD substrate 42 includes a substrate 61 and a plurality of connection pads 62. In FIG. 3, illustration of a concave lens 71 (to be described later) has been omitted (refer to FIG. 4).

The substrate 51 is a semiconductor substrate such as a GaAs (gallium arsenide) substrate. FIG. 3 shows a front surface S1 of the substrate 51 facing the −Z direction and a rear surface S2 of the substrate 51 facing the +Z direction. The front surface S1 is an example of the first surface according to the present disclosure. The rear surface S2 is an example of the second surface according to the present disclosure.

The laminated film 52 includes a plurality of layers laminated on the front surface S1 of the substrate 51. Examples of the layers include an n-type semiconductor layer, an active layer, a p-type semiconductor layer, a light reflection layer, and an insulating layer having a light emission window. The laminated film 52 includes a plurality of mesa portions M which protrude in the −Z direction. Apart of the mesa portions M constitutes the plurality of light-emitting elements 53.

The plurality of light-emitting elements 53 are provided on the side of the front surface S1 of the substrate 52 as a part of the laminated film 52. Each light-emitting element 53 according to the present embodiment has a VCSEL structure and emits light in the +Z direction. As shown in FIG. 3, light emitted from each light-emitting element 53 is transmitted inside the substrate 51 from the front surface S1 to the rear surface S2 and enters the correcting lens 46 (FIG. 2) described above from the substrate 51. As described above, the LD chip 41 according to the present embodiment is a backside illumination-type VCSEL chip.

The anode electrode 54 is formed on a lower surface of the light-emitting element 53. The cathode electrode 55 is formed on a lower surface of a mesa portion M other than the light-emitting element 53 and extends to a lower surface of the laminated film 52 between the mesa portions M. Each light-emitting element 53 emits light when a current flows between the anode electrode 54 and a corresponding cathode electrode 55.

As described above, the LD chip 41 is arranged on the LDD substrate 42 via the bump 48 and the LD chip 41 is electrically connected to the LDD substrate 42 by the bump 48. Specifically, the connection pad 62 is formed on the substrate 61 included in the LDD substrate 42 and the mesa portion M is arranged on the connection pad 62 via the bump 48. Each mesa portion M is arranged on the bump 62 via the anode electrode 54 or the cathode electrode 55. The substrate 61 is a semiconductor substrate such as a Si (silicon) substrate.

Figure 4:
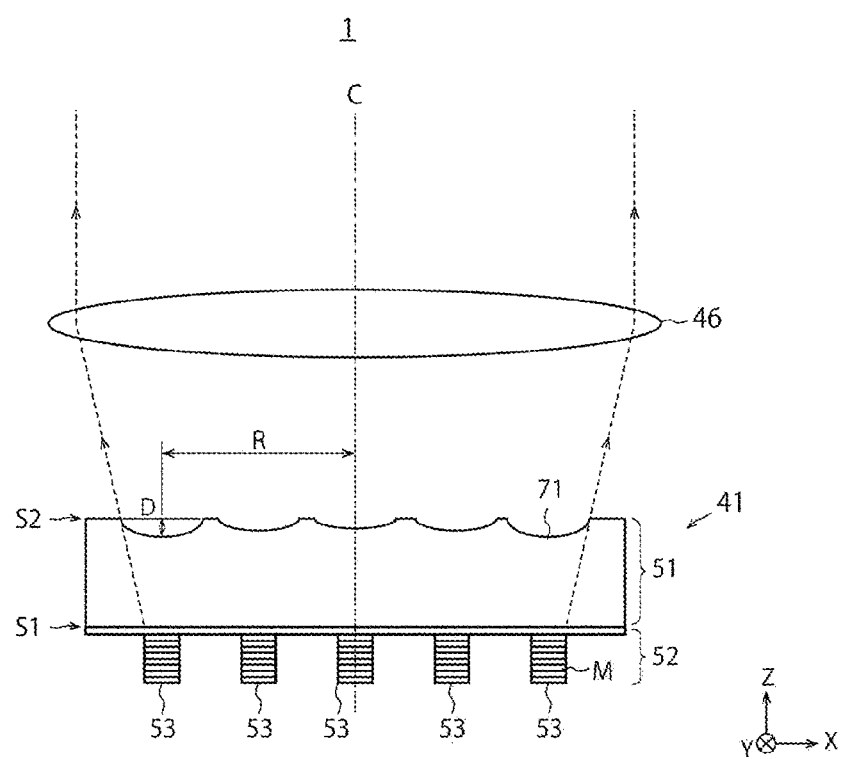
FIG. 4 is a sectional view showing a structure of a light-emitting apparatus according to the first embodiment.

The LDD substrate 42 includes the drive circuit 12 which drives the light-emitting unit 11 (FIG. 1). FIG. 4 schematically shows a plurality of switches SW included in the drive circuit 12. Each switch SW is electrically connected to a corresponding light-emitting element 53 via the bump 62. The drive circuit 12 according to the present embodiment is capable of controlling (on/off) the switches SW on an individual basis. Therefore, the drive circuit 12 can drive the plurality of light-emitting elements 53 on the basis of each light-emitting element 53. Accordingly, light emitted from the light-emitting unit 11 can be controlled precisely such as causing only the light-emitting elements 53 necessary for ranging to emit light. Arranging the LDD substrate 42 below the LD chip 41 provides an easier way to connect electrically between the respective light-emitting elements 53 and the corresponding switches SW. Thus, such individual control of the light-emitting elements 53 is realized. The LDD substrate 42 is an example of the drive apparatus according to the present disclosure.

FIG. 4 is a sectional view showing a structure of the light-emitting apparatus 1 according to the first embodiment.

FIG. 4 shows a cross section of the LD chip 41 inside the light-emitting apparatus 1. As described above, the LD chip 41 includes the substrate 51, the laminated film 52, a plurality of the light-emitting elements 53, a plurality of the anode electrodes 54, and a plurality of the cathode electrodes 55. It should be noted that illustration of the anode electrodes 54 and the cathode electrodes 55 has been omitted in FIG. 4.

The LD chip 41 according to the present embodiment includes the plurality of light-emitting elements 53 on the side of the front surface S1 of the substrate 51 and, at the same time, includes a plurality of concave lenses 71 on the side of the rear surface S2 of the substrate 51. The concave lenses 71 are arranged in a two-dimensional array pattern in a similar manner to the light-emitting elements 53. The concave lenses 71 according to the present embodiment correspond one-to-one to the light-emitting elements 53, and each concave lens 71 is arranged in the +Z direction of one light-emitting element 53. FIG. 4 further shows the correcting lens 46 described earlier which is arranged above the substrate 51.

The concave lenses 71 are an example of the first lens according to the present disclosure and the correcting lens 46 is an example of the second lens according to the present disclosure.

The concave lens 71 according to the present embodiment is provided on the rear surface S2 of a substrate 1 as a part of the substrate 51. Specifically, the concave lens 71 according to the present embodiment is formed by machining the substrate 51 from the rear surface S2. According to the present embodiment, the concave lens 71 can be readily formed by machining of the substrate 51. It should be noted that, in a similar manner to the correcting lens 46, the concave lens 71 may not constitute a part of the substrate 51 or the concave lens 71 may be arranged above the substrate 51 at a distance from the rear surface S2 of the substrate 51.

Light emitted from the plurality of light-emitting elements 53 is transmitted inside the substrate 51 from the front surface S1 to the rear surface S2 and enters the plurality of concave lenses 71. In the present embodiment, light emitted from each light-emitting element 53 is incident on a corresponding concave lens 71. Light having passed through the concave lenses 71 is incident on the correcting lens 46 as shown in FIG. 4. In FIG. 4, the concave lenses 71 diffuse the light from the light-emitting elements 53 and the correcting lens 46 collimates the light from the concave lenses 71 to create parallel light. The light having passed through the correcting lens 46 is emitted toward the subject (FIG. 1).

FIG. 4 further shows an optical center (a central axis) C of the correcting lens 46. In FIG. 4, the front surface S1 of the substrate 51 is perpendicular to the Z direction and the optical center C of the correcting lens 46 is parallel to the Z direction. In the present embodiment, a shape of the plurality of concave lenses 71 changes in accordance with a distance R from the optical center C of the correcting lens 46. Specifically, while keeping an area in an XY plane of the concave lenses 71 uniform, a depth D in the Z direction of the concave lenses 71 increases in accordance with the distance R from the optical center C. As a result, a radius of curvature of the concave lenses 71 decreases in accordance with the distance R from the optical center C. It should be noted that the area in an XY plane of the concave lenses 71 need not be uniform.

According to the present embodiment, by reducing the radius of curvature of the concave lenses 71 in accordance with the distance R from the optical center C, an aberration of the correcting lens 46 can be reduced. This is because light emitted from a concave lens 71 which is far from the optical center C spreads wider than light emitted from a concave lens 71 which is close to the optical center C and the correcting lens 46 can more readily collimate light from the concave lenses 71. Accordingly, a high-resolution imaging apparatus 2 (FIG. 1) can be realized.

Supposing that the area and the depth D of the concave lenses 71 are kept uniform, light emitted from a concave lens 71 which is far from the optical center C spreads by more or less the same amount as light emitted from a concave lens 71 which is close to the optical center C. As a result, the correcting lens 46 can less readily collimate light from the concave lenses 71 as compared to the case of the present embodiment and an aberration is created in the correcting lens 46. Specifically, parallelism of light emitted from near an end of the correcting lens 46 deteriorates and an end of an image becomes blurry or distorted. On the other hand, according to the present embodiment, the correcting lens 46 can more readily collimate light from the concave lenses 71 and an aberration of the correcting lens 46 can be reduced.

The depth D of the concave lens 71 may become deeper in proportion to the distance R from the optical center C or may become deeper by an aspect other than proportion in accordance with the distance R from the optical center C. In addition, with respect to the concave lenses 71 provided on the substrate 51, the depth D of all concave lenses 71 may become deeper in accordance with the distance R from the optical center C or only the depth D of a part of the concave lenses 71 may become deeper in accordance with the distance R from the optical center C.

Figure 5:
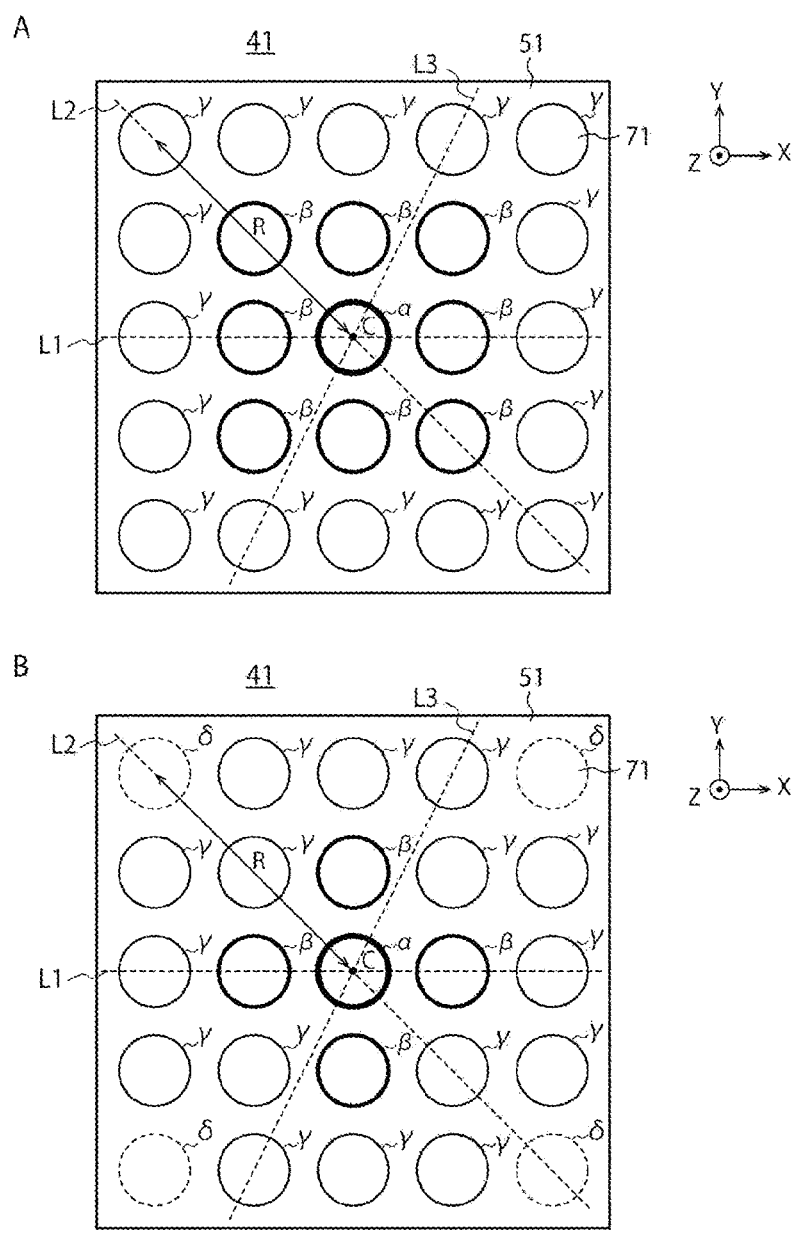
FIG. 5 is a plan view showing an example of the structure of the light-emitting apparatus according to the first embodiment.

FIG. 5 is a plan view showing an example of the structure of the light-emitting apparatus 1 according to the first embodiment.

A in FIG. 5 shows a first example of the structure of the light-emitting apparatus 1 according to the first embodiment. In A in FIG. 5, 5×5-number of concave lenses 71 are arranged in a two-dimensional array pattern or, more specifically, in a square lattice shape on the rear surface S2 of the substrate 51. In A in FIG. 5, a single concave lens 71 having a depth α is arranged on the optical center C, eight concave lenses 71 having a depth ß (>α) are arranged around the single concave lens 71 with a depth of α, and 16 concave lenses 71 having a depth γ (>ß) are arranged around the eight concave lens 71 with a depth of ß. As a result, the depth D of the concave lenses 71 increases in accordance with the distance R from the optical center C. For example, the depth D of the concave lenses 71 on a straight line L1 and the depth D of the concave lenses 71 on a straight line L2 increase on an order of "α, ß, γ, . . . " and the depth D of the concave lenses 71 on a straight line L3 increases on an order of "α, γ, . . . ".

B in FIG. 5 shows a second example of the structure of the light-emitting apparatus 1 according to the first embodiment. In A in FIG. 5, a single concave lens 71 having a depth α is arranged on the optical center C, four concave lenses 71 having a depth ß (>α) are arranged around the single concave lens 71 with a depth of α, 16 concave lenses 71 having a depth γ (>ß) are arranged around the four concave lens 71 with a depth of ß, and a plurality of concave lenses 71 having a depth δ (>γ) are arranged around the 16 concave lens 71 with a depth of γ. As a result, the depth D of the concave lenses 71 increases in accordance with the distance R from the optical center C. For example, the depth D of the concave lenses 71 on a straight line L1 increases on an order of "α, ß, γ, . . . " and the depth D of the concave lenses 71 on a straight line L2 increases on an order of "α, γ, δ, . . . ".

A planar arrangement of the concave lenses 71 according to the present embodiment may be the arrangement of the first example or the second example or yet another arrangement. In addition, in the present embodiment, instead of the shape of the concave lenses 71, the arrangement of the concave lenses 71 may change in accordance with the distance R from the optical center C. Furthermore, the light-emitting apparatus 1 according to the present embodiment may include, in place of the concave lenses 71, lenses of a different type from the concave lens 71 such as a convex lens or a binary lens. Hereinafter, a light-emitting apparatus 1 according to modifications of the present embodiment will be described with reference to FIG. 6 to FIG. 10.

Figure 6:
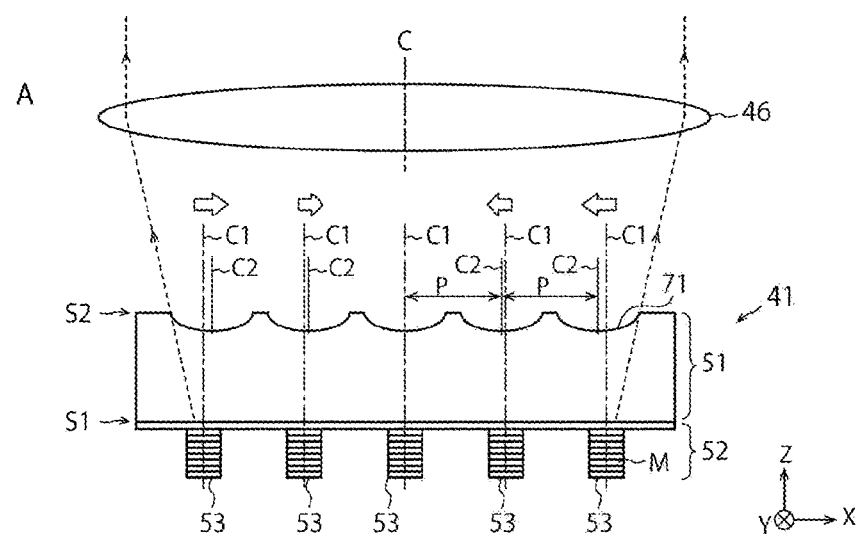
FIG. 6 is a sectional view showing a structure of a light-emitting apparatus according to a modification of the first embodiment.
Figure 6:
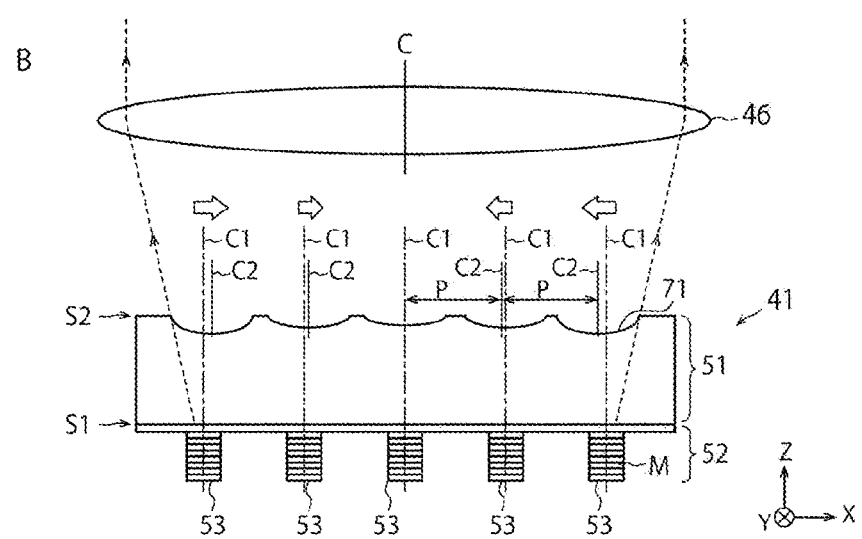

FIG. 6 is a sectional view showing a structure of the light-emitting apparatus 1 according to a modification of the first embodiment.

In A in FIG. 6, a position of each concave lens 71 has shifted from a position indicated by a line C1 to a position indicated by a line C2. The line C1 indicates the position of each concave lens 71 when the concave lenses 71 are arranged at regular intervals as shown in FIG. 4. Therefore, intervals between the lines C1 adjacent to each other are constant. On the other hand, the line C2 indicates the position of each concave lens 71 when the concave lenses 71 are arranged shifted to a side of the optical center C from the lines C1. A reference sign P indicates an interval between the lines C2 adjacent to each other or, in other words, a pitch between the concave lenses 71.

In A in FIG. 6, an arrangement of the plurality of concave lenses 71 changes in accordance with the distance R from the optical center C of the correcting lens 46. Specifically, while keeping an area and a depth of the concave lenses 71 uniform, the pitch P between the concave lenses 71 shortens in accordance with the distance R from the optical center C. In other words, the pitch P between the concave lenses 71 decreases in accordance with the distance R from the optical center C. It should be noted that the area and the depth of the concave lenses 71 need not be uniform.

According to the present modification, by reducing the pitch P between the concave lenses 71 in accordance with the distance R from the optical center C, an aberration of the correcting lens 46 can be reduced. The reason therefor is similar to that of the case shown in FIG. 4. Accordingly, a high-resolution imaging apparatus 2 can be realized.

Changing the shape of the concave lens 71 as shown in FIG. 4 has an advantage that, for example, an aberration of the correcting lens 46 can be accurately reduced. On the other hand, changing the arrangement of the concave lenses 71 as shown in A in FIG. 6 has an advantage that, for example, the concave lenses 71 are readily created.

In B in FIG. 6, a shape and an arrangement of the plurality of concave lenses 71 change in accordance with the distance R from the optical center C of the correcting lens 46. Specifically, while keeping an area of the concave lenses 71 uniform, the depth D of the concave lenses 71 increases in accordance with the distance R and, at the same time, the pitch P between the concave lenses 71 decreases in accordance with the distance R. As a result, a radius of curvature of the concave lenses 71 decreases in accordance with the distance R and, at the same time, the pitch P between the concave lenses 71 decreases in accordance with the distance R.

As described above, in the present modification, both a shape and an arrangement of the concave lenses 71 may be changed in accordance with the distance R from the optical center C of the correcting lens 46. Accordingly, an aberration of the correcting lens 46 can be more accurately reduced.

Figure 7:
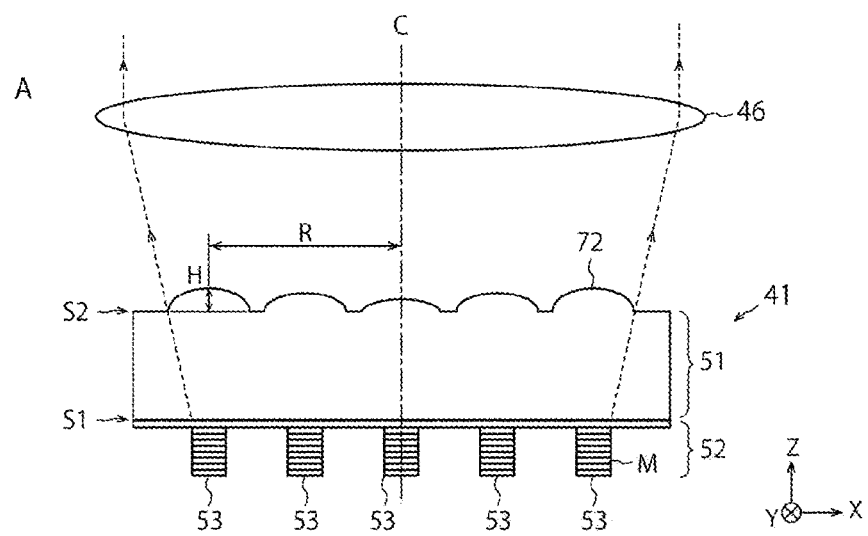
FIG. 7 is a sectional view showing a structure of a light-emitting apparatus according to another modification of the first embodiment.
Figure 7:
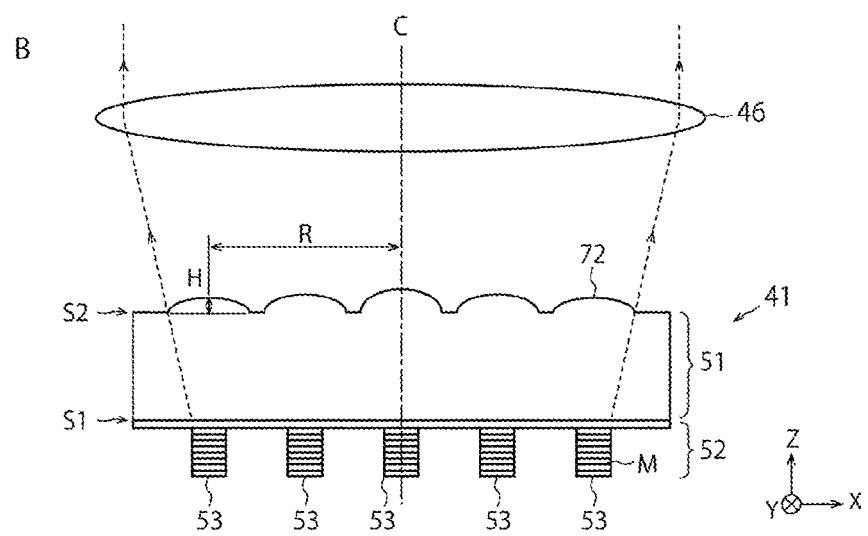

FIG. 7 is a sectional view showing a structure of the light-emitting apparatus 1 according to another modification of the first embodiment.

The LD chip 41 shown in A in FIG. 7 includes the plurality of light-emitting elements 53 on the side of the front surface S1 of the substrate 51 and, at the same time, a plurality of convex lenses 72 on the side of the rear surface S2 of the substrate 51. An arrangement and a mode of machining of the convex lenses 72 are more or less similar to those of the concave lenses 71. The convex lenses 72 are an example of the first lens according to the present disclosure.

In A in FIG. 7, a shape of the plurality of convex lenses 72 changes in accordance with the distance R from the optical center C of the correcting lens 46. Specifically, while keeping an area in an XY plane of the convex lenses 72 uniform, a height H in the Z direction of the convex lenses 72 increases in accordance with the distance R from the optical center C. As a result, a radius of curvature of the convex lenses 72 decreases in accordance with the distance R from the optical center C. It should be noted that the area in the XY plane of the convex lenses 72 need not be uniform.

According to the present modification, by reducing the radius of curvature of the convex lenses 72 in accordance with the distance R from the optical center C, an aberration of the correcting lens 46 can be reduced. The reason therefor is similar to that of the case shown in FIG. 4. Accordingly, a high-resolution imaging apparatus 2 can be realized.

Changing the shape of the convex lens 72 as shown in A in FIG. 7 has an advantage that, for example, an aberration of the correcting lens 46 can be accurately reduced in a similar manner to changing the shape of the concave lenses 71 as shown in FIG. 4. On the other hand, changing the arrangement of the concave lenses 71 as shown in A in FIG. 6 has an advantage that, for example, the concave lenses 71 are readily created. It should be noted that the concave lenses 71 in A in FIG. 6 and in B in FIG. 6 may be replaced with the convex lenses 72.

In B in FIG. 7, contrarily to A in FIG. 7, the height H of the convex lenses 72 decreases in accordance with the distance R from the optical center C. As a result, a radius of curvature of the convex lenses 72 increases in accordance with the distance R from the optical center C. Depending on performance or an aberration of the correcting lens 46, the convex lenses 72 may be formed in such a shape. For example, when the correcting lens 46 is a concave lens instead of a convex lens, such convex lenses 72 can conceivably be adopted. A similar description applies to the radius of curvature (depth D) of the concave lenses 71 shown in FIG. 4, the pitch P between the concave lenses 71 shown in A in FIG. 6, and the radius of curvature of a binary lens 73 shown in FIG. 8 to be described later.

Figure 8:
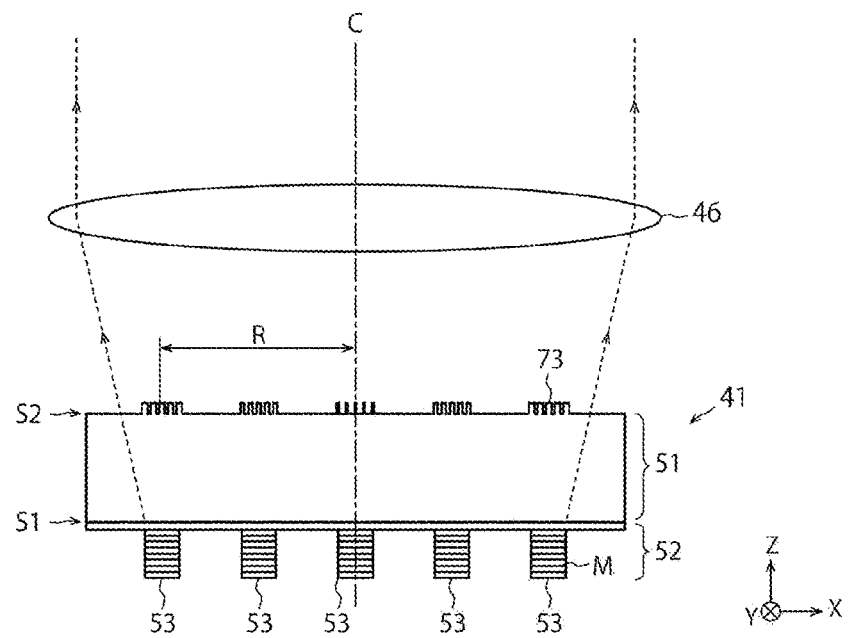
FIG. 8 is a sectional view showing a structure of a light-emitting apparatus according to another modification of the first embodiment.

FIG. 8 is a sectional view showing a structure of the light-emitting apparatus 1 according to another modification of the first embodiment.

The LD chip 41 shown in FIG. 8 includes the plurality of light-emitting elements 53 on the side of the front surface S1 of the substrate 51 and, at the same time, a plurality of binary lenses 73 on the side of the rear surface S2 of the substrate 51. An arrangement and a mode of machining of the binary lenses 73 are more or less similar to those of the concave lenses 71. The binary lenses 73 are an example of the first lens according to the present disclosure.

In FIG. 8, a shape of the plurality of binary lenses 73 changes in accordance with the distance R from the optical center C of the correcting lens 46. Specifically, while keeping an area in an XY plane of the binary lenses 73 uniform, a radius of curvature of the binary lenses 73 decreases in accordance with the distance R from the optical center C. It should be noted that the area in an XY plane of the binary lenses 72 need not be uniform.

According to the present modification, by reducing the radius of curvature of the binary lenses 73 in accordance with the distance R from the optical center C, an aberration of the correcting lens 46 can be reduced. The reason therefor is similar to that of the case shown in FIG. 4. Accordingly, a high-resolution imaging apparatus 2 can be realized.

Changing the shape of the binary lens 73 as shown in FIG. 8 has an advantage that, for example, an aberration of the correcting lens 46 can be accurately reduced in a similar manner to changing the shape of the concave lenses 71 as shown in FIG. 4 or changing the shape of the convex lenses 72 as shown in A in FIG. 7. On the other hand, changing the arrangement of the concave lenses 71 as shown in A in FIG. 6 has an advantage that, for example, the concave lenses 71 are readily created. It should be noted that the binary lens 73 has an advantage that, for example, the binary lens 73 may be more readily created than the concave lens 71 and the convex lens 72. It should also be noted that the concave lenses 71 in A in FIG. 6 and in B in FIG. 6 may be replaced with the binary lenses 73.

Figure 9:
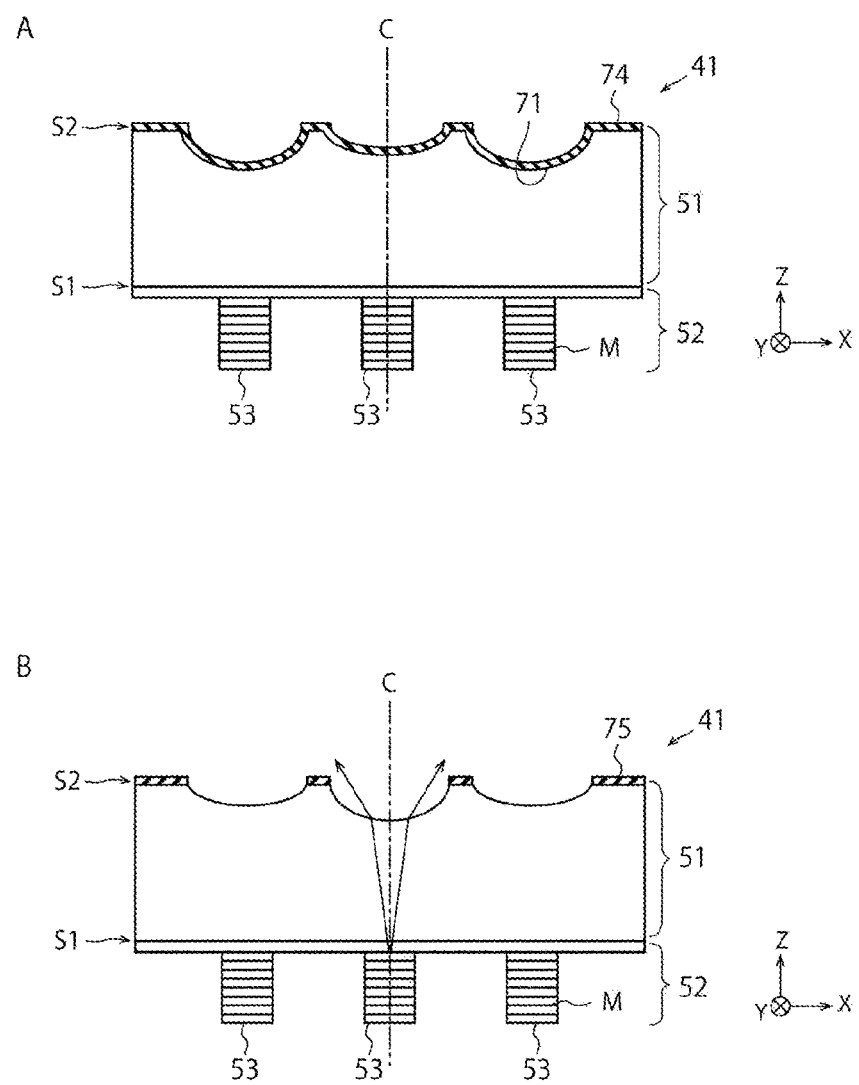
FIG. 9 is a sectional view showing a structure of a light-emitting apparatus according to another modification of the first embodiment.

FIG. 9 is a sectional view showing a structure of the light-emitting apparatus 1 according to another modification of the first embodiment.

The LD chip 41 shown in A in FIG. 9 includes an antireflective film 74 formed on the rear surface S2 of the substrate 51. The antireflective film 74 covers a surface of each concave lens 71. The antireflective film 74 according to the present modification includes one or more layers of an inorganic oxide film or an inorganic nitride film and, for example, includes one or more of a $SiO_2$ film (silicon oxide film), a SiON film (silicon oxynitride film), a SiN film (silicon nitride film), a SiOC film (silicon oxycarbide film), a SiC film (silicon carbide film), a $TiO_2$ film (titanium oxide film), a TiN film (titanium nitride film), a TiON film (titanium oxynitride film), an $Al_2O_3$ film (aluminum oxide film), a $Nb_2O_5$ film (niobium oxide film), a $ZrO_2$ film (zirconium oxide film), and a $Ta_2O_5$ film (tantalum oxide film).

According to the present modification, by forming the antireflective film 74 on the rear surface S2 of the substrate 51, light can be prevented from being reflected by the concave lenses 71 and the like. When the substrate 51 is a GaAs substrate, since reflectance of the GaAs substrate is high, the antireflective film 74 is desirably formed on the rear surface S2 of the substrate 51. It should be noted that, even when the LD chip 41 includes the convex lenses 72 or the binary lenses 73, the antireflective film 74 may be formed on the surfaces of the convex lenses 72 or the binary lenses 73.

The LD chip 41 shown in B in FIG. 9 includes an inorganic film 75 formed on the rear surface S2 of the substrate 51 between the concave lenses 71. Therefore, each concave lens 71 is exposed from the inorganic film 75. For example, the inorganic film 75 according to the present modification includes one or more of a $SiO_2$ film, a SiON film, a SiN film, a SiOC film, a SiC film, a W (tungsten) film, a Ti film, an Au (gold) film, and an Al film.

According to the present modification, by forming the inorganic film 75 on the rear surface S2 of the substrate 51 between the concave lenses 71, for example, light can be prevented from passing through portions other than the concave lenses 71. The inorganic film 75 in this case may be a light-shielding film or another film which enables light from the substrate 51 to readily return to the substrate 51. It should be noted that, even when the LD chip 41 includes the convex lenses 72 or the binary lenses 73, the inorganic film 75 may be formed on the rear surface S2 of the substrate 51 between the convex lenses 72 or between the binary lenses 73.

Figure 10:
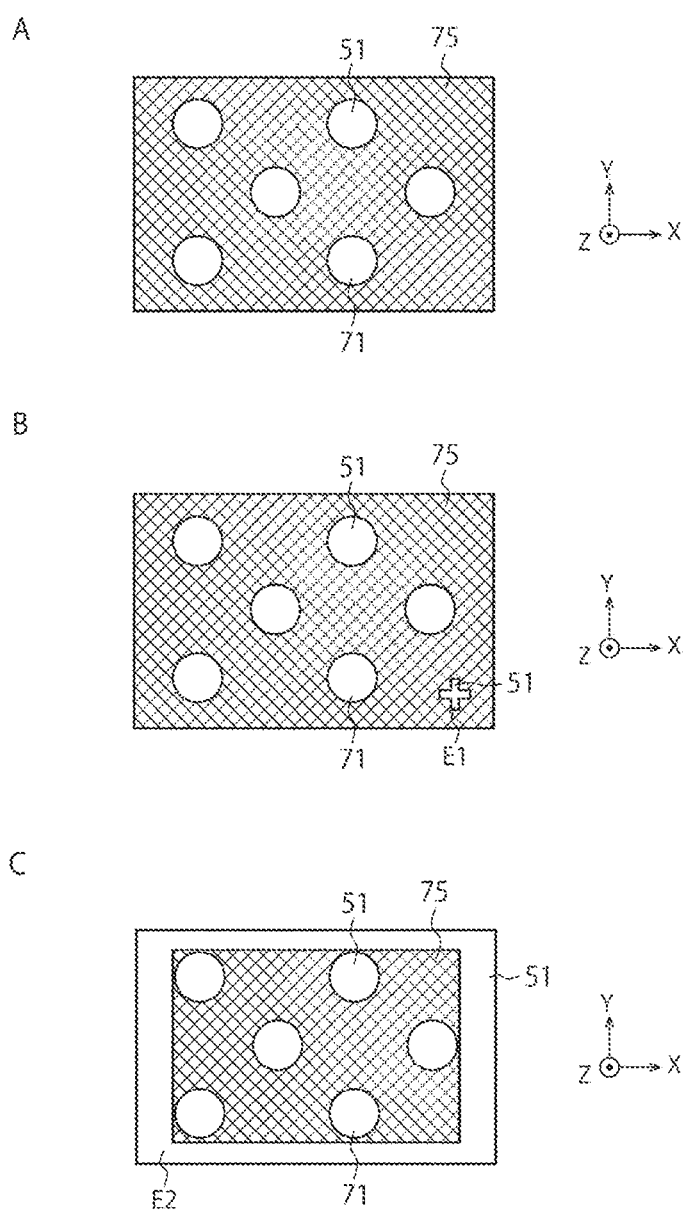
FIG. 10 is a plan view showing an example of the structure of the light-emitting apparatus shown in B in FIG. 9.

FIG. 10 is a plan view showing an example of the structure of the light-emitting apparatus 1 shown in B in FIG. 9.

In A in FIG. 10, the inorganic film 75 is formed on the entire rear surface S2 of the substrate 51 with the exception of regions of the concave lenses 71. Accordingly, for example, light can be effectively prevented from passing through portions other than the concave lenses 71.

In B in FIG. 10, an opening E1 which exposes the rear surface S2 of the substrate 51 is formed inside the inorganic film 75. For example, the opening E1 can be used as an alignment mark for aligning positions of the concave lenses 71 with positions of other optical elements.

In C in FIG. 10, the inorganic film 75 is not formed on the rear surface S2 of the substrate 51 in a region E2 near an end of the substrate 51. When using the inorganic film 75 to prevent light from passing through portions other than the concave lenses 71, the inorganic film 75 need not necessarily be formed in regions that are far away from the light-emitting elements 53 or the concave lenses 71. Therefore, in C in FIG. 10, the inorganic film 75 is not formed in the region E2 near the end of the substrate 51.

It should be noted that the inorganic film 75 may include a different film depending on a location on the rear surface S2 of the substrate 51. For example, the inorganic film 75 may include one type of film in a region near the end of the substrate 51 and may include two types of films in other regions. Accordingly, a function similar to that of the inorganic film 75 in C in FIG. 10 can be realized.

Figure 11:
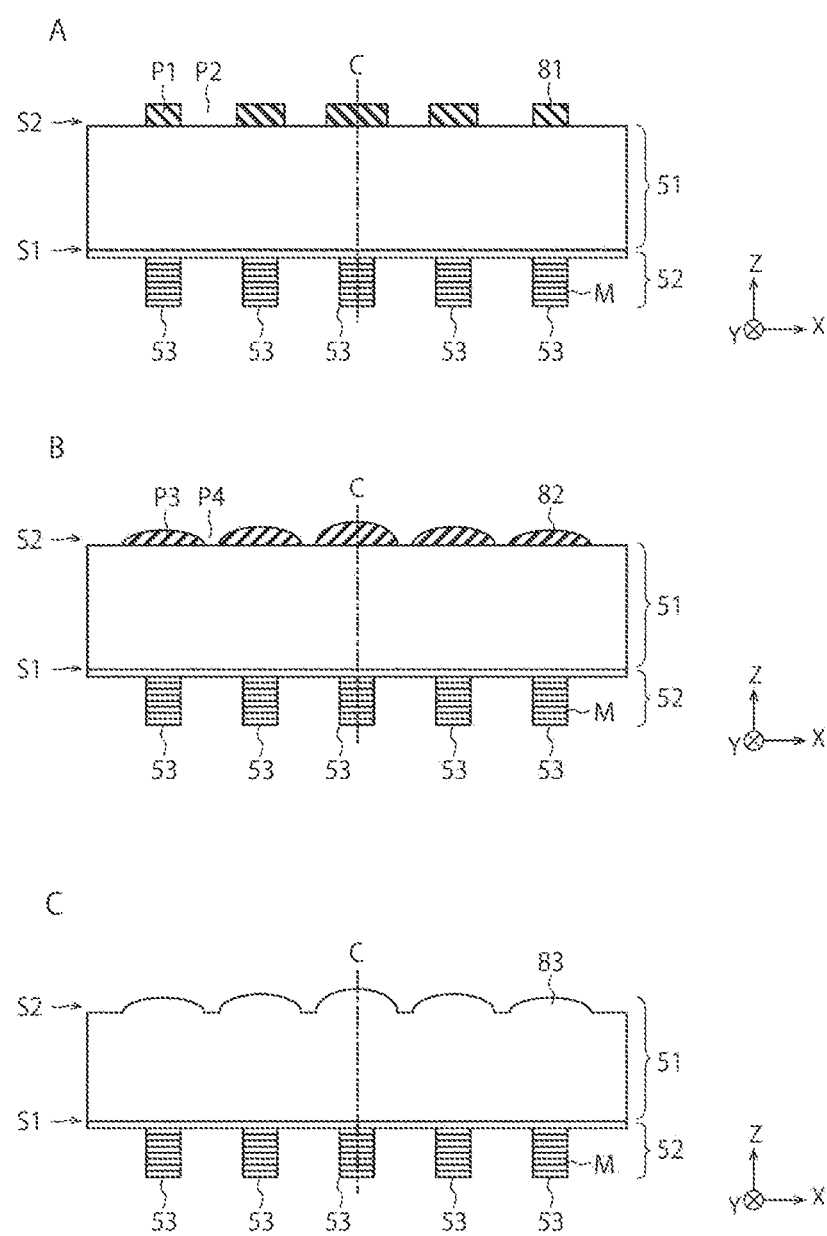
FIG. 11 is a sectional view (1/2) showing a manufacturing method of the light-emitting apparatus according to the first embodiment.
Figure 12:
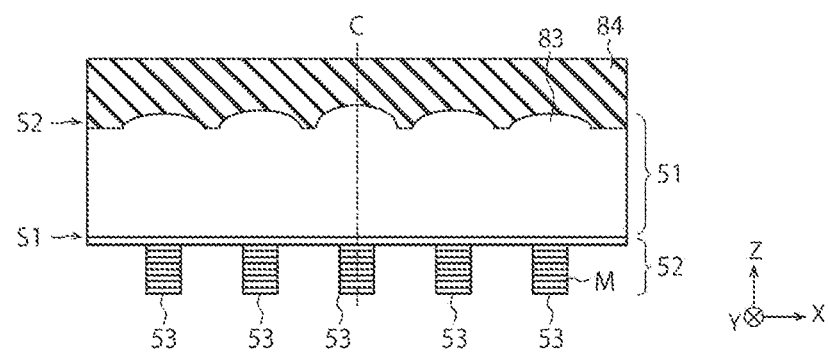
FIG. 12 is a sectional view (2/2) showing a manufacturing method of the light-emitting apparatus according to the first embodiment.
Figure 12:
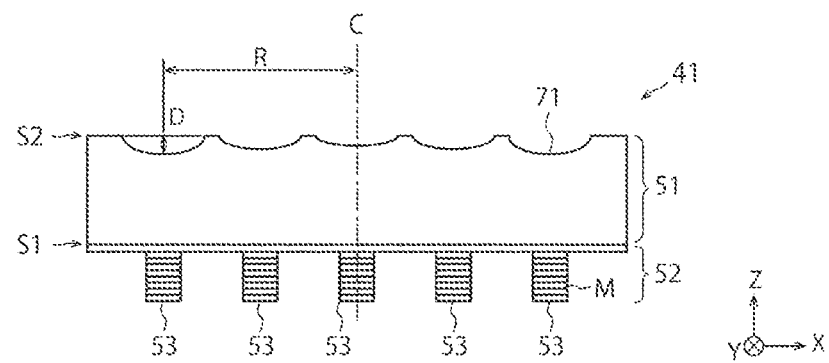

FIG. 11 and FIG. 12 are sectional views showing a manufacturing method of the light-emitting apparatus 1 according to the first embodiment.

First, after forming the laminated film 52, the light-emitting elements 53, and the like on the front surface S1 of the substrate 51, a resist film 81 is formed on the rear surface S2 of the substrate 51 and the resist film 81 is lithographically patterned (A in FIG. 11). As a result, the resist film 81 including a plurality of resist portions P1 and openings P2 is formed on the rear surface S2 of the substrate. The resist portions P1 are formed above the light-emitting elements 53. It should be noted that five resist portions P1 shown in A in FIG. 11 include one large resist portion P1, two midsize resist portions P1, and two small resist portions P1.

Next, reflow bake of the patterned resist film 81 is performed (B in FIG. 11). As a result, the resist film 81 changes into a resist film 82 which includes a plurality of resist portions P3 having been rounded due to surface tension. The resist film 82 includes a plurality of resist portions P3 and openings P4. The large resist portion P1, the midsize resist portions P1, and the small resist portions P1 have respectively changed into a large resist portion P3, midsize resist portions P3, and small resist portions P3.

Next, the resist portions (resist pattern) P3 of the baked resist film 82 are transferred to the substrate 51 by dry etching (C in FIG. 11). As a result, the rear surface S2 of the substrate 51 is machined by dry etching and a plurality of convex portions 83 having a shape similar to the resist portions P3 prior to the dry etching are formed on the rear surface S2 of the substrate 51. The large resist portion P3, the midsize resist portions P3, and the small resist portions P3 have respectively changed into a large convex portion 83, midsize convex portions 83, and small convex portions 83.

Next, a hard mask layer 84 is formed on the rear surface S2 of the substrate 51 so as to cover the convex portions 83 (A in FIG. 12). The hard mask layer 84 is, for example, an SOG (Spin On Glass) layer.

Next, the hard mask layer 84 is gradually removed by dry etching (B in FIG. 12). As a result, the convex portions 83 are exposed from the hard mask layer 84 by dry etching, and as the hard mask layer 84 is removed together with the convex portions 83 by subsequent dry etching, the convex portions 83 change into concave portions or, in other words, the concave lenses 71. The plurality of concave lenses 71 are formed on the rear surface S2 of the substrate 51 in this manner. For example, dry etching is performed using a chlorine-based gas such as $BCl_3$ gas or $Cl_2$ gas (where B denotes boron and Cl denotes chlorine). $O_2$ (oxygen) gas, $N_2$ (nitrogen) gas, or Ar (argon) gas may be used together with the chlorine-based gas. Details of this step will be explained with reference to FIG. 13.

Figure 13:
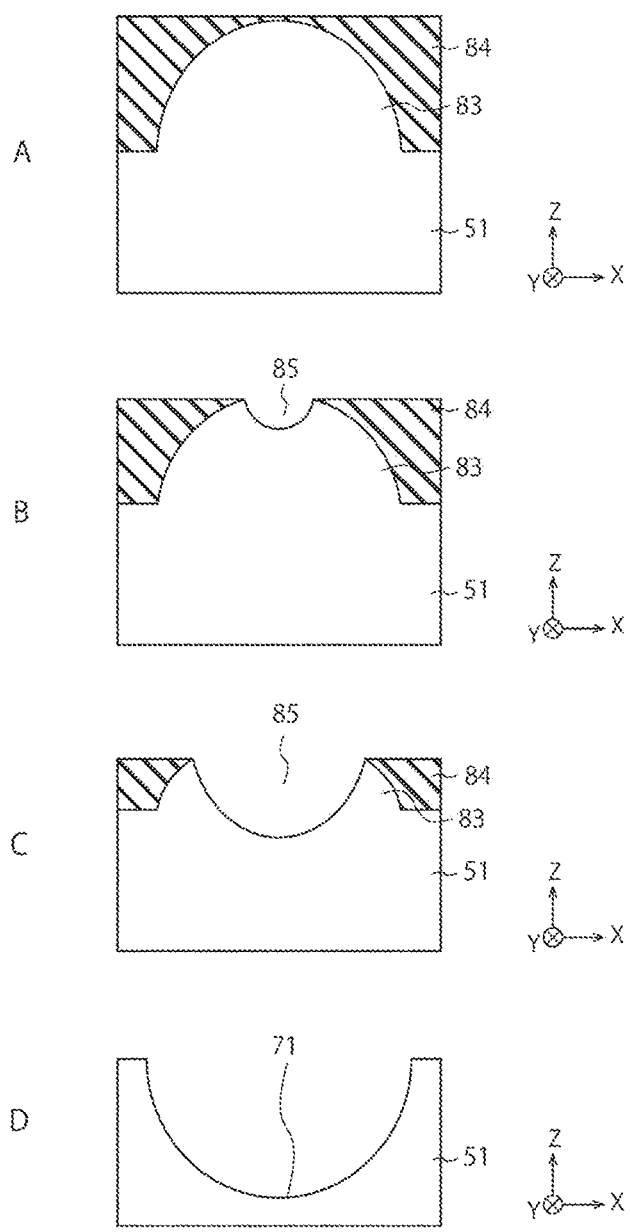
FIG. 13 is a sectional view for explaining details of a step shown in B in FIG. 12.

FIG. 13 is a sectional view for explaining details of the step shown in B in FIG. 12.

A in FIG. 13 shows the convex portion 83 covered by the hard mask layer 84. As the hard mask layer 84 is gradually removed by dry etching, the convex portion 83 is exposed from the hard mask layer 84 (B in FIG. 13). In subsequent dry etching, due to a difference in etching rates between the substrate 51 (a GaAs substrate) and the hard mask layer 84 (a SOG film), the convex portion 83 is etched at a faster etching rate than the hard mask layer 84 (C in FIG. 13). As a result, a concave portion 85 is formed at an upper end of the convex portion 83, a size of the concave portion 85 gradually increases, and as the convex portion 83 is finally removed, the concave portion 85 or, in other words, the concave lens 71 is formed at a position from which the convex portion 83 has been removed. The step shown in B in FIG. 12 proceeds in this manner.

In the steps shown in A to D in FIG. 13, since the small convex portion 83 disappears sooner due to dry etching, the small convex portion 83 changes into a large concave lens 71. On the other hand, since the large convex portion 83 is not quickly removed by the dry etching, the large convex portion 83 changes into a small concave lens 71. As a result, in B in FIG. 12, the large convex portion 83, the midsize convex portions 83, and the small convex portions 83 respectively change into the small concave lens 71 (the concave lens 71 of which a depth D is shallow), the midsize concave lenses 71, and the large concave lenses 71 (the concave lenses 71 of which a depth D is deep).

In the present embodiment, subsequently, the correcting lens 46 described earlier is arranged above the concave lenses 71 (refer to FIG. 4). As a result, the shapes of the concave lenses 71 change in accordance with the distance R from the optical center C of the correcting lens 46. The light-emitting apparatus 1 shown in FIG. 4 is manufactured in this manner.

When manufacturing the light-emitting apparatus 1 shown in A in FIG. 6, the resist film 81 including resist portions P1 of a same size is formed. However, the pitch between the resist portions P1 is set based on the pitch P between the concave lenses 71 to be formed.

Figure 14:
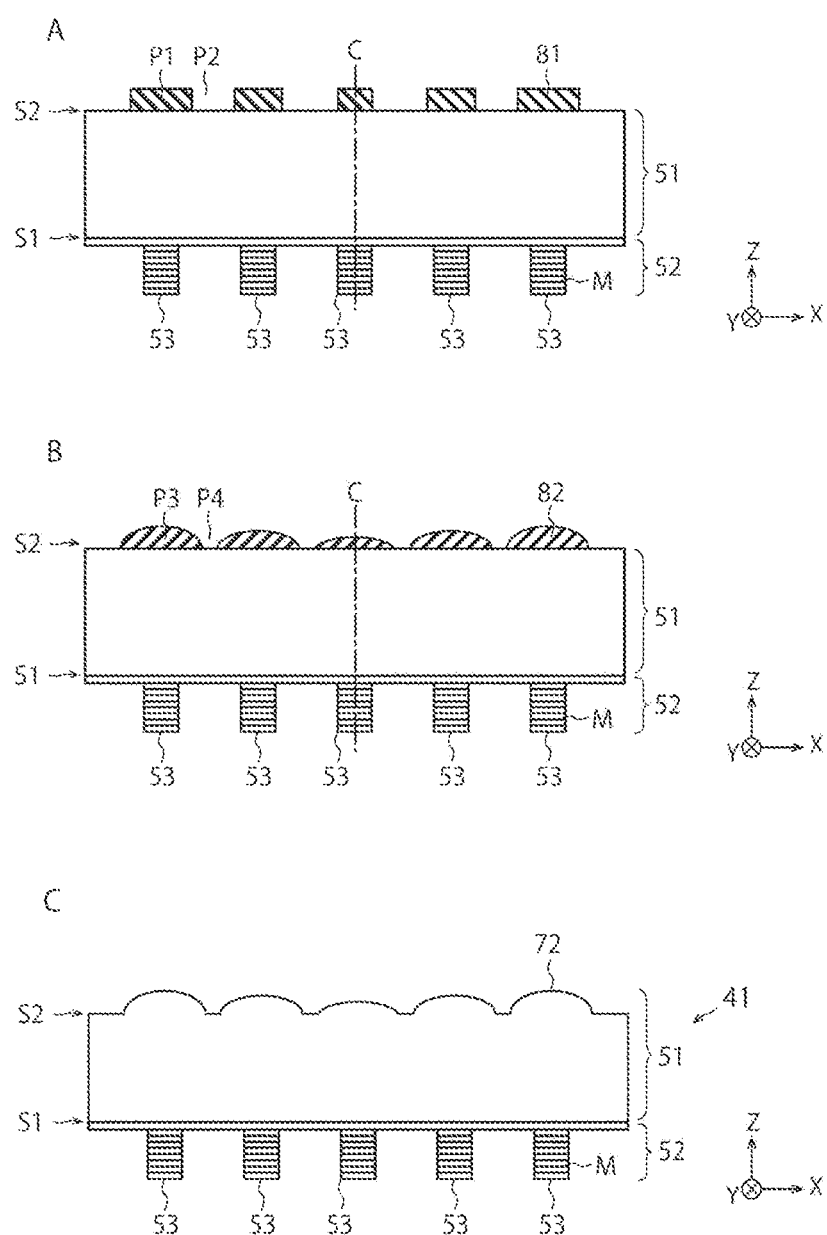
FIG. 14 is a sectional view showing a manufacturing method of a light-emitting apparatus according to a modification of the first embodiment.

FIG. 14 is a sectional view showing a manufacturing method of the light-emitting apparatus 1 according to a modification of the first embodiment.

First, after forming the laminated film 52, the light-emitting elements 53, and the like on the front surface S1 of the substrate 51, a resist film 81 is formed on the rear surface S2 of the substrate 51 and the resist film 81 is lithographically patterned (A in FIG. 14). As a result, the resist film 81 including a plurality of resist portions P1 and openings P2 is formed on the rear surface S2 of the substrate. The resist portions P1 are formed above the light-emitting elements 53. It should be noted that five resist portions P1 shown in A in FIG. 14 include one small resist portion P1, two midsize resist portions P1, and two large resist portions P1.

Next, reflow bake of the patterned resist film 81 is performed (B in FIG. 14). As a result, the resist film 81 changes into a resist film 82 which includes a plurality of resist portions P3 having been rounded due to surface tension. The resist film 82 includes a plurality of resist portions P3 and openings P4. The small resist portion P1, the midsize resist portions P1, and the large resist portions P1 have respectively changed into a small resist portion P3, midsize resist portions P3, and large resist portions P3.

Next, the resist portions (resist pattern) P3 of the baked resist film 82 are transferred to the substrate 51 by dry etching (C in FIG. 14). As a result, the rear surface S2 of the substrate 51 is machined by dry etching and a plurality of convex portions having a shape similar to the resist portions P3 prior to the dry etching or, in other words, a plurality of convex lenses 72 are formed on the rear surface S2 of the substrate 51. The small resist portion P3, the midsize resist portions P3, and the small resist portions P3 have respectively changed into a large convex lens 72, midsize convex lenses 72, and small convex lenses 72.

In the present embodiment, subsequently, the correcting lens 46 described earlier is arranged above the convex lenses 72 (refer to A in FIG. 7). As a result, the shapes of the convex lenses 72 change in accordance with the distance R from the optical center C of the correcting lens 46. The light-emitting apparatus 1 shown in A in FIG. 7 is manufactured in this manner.

As described above, since the convex lens 72 can be formed without performing a step using the hard mask layer 84, the convex lens 72 can be more readily formed than the concave lens 71.

Figure 15:
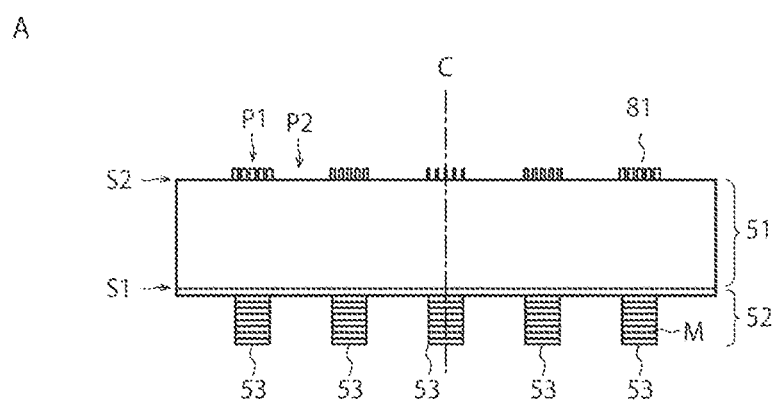
FIG. 15 is a sectional view showing a manufacturing method of a light-emitting apparatus according to another modification of the first embodiment.
Figure 15:
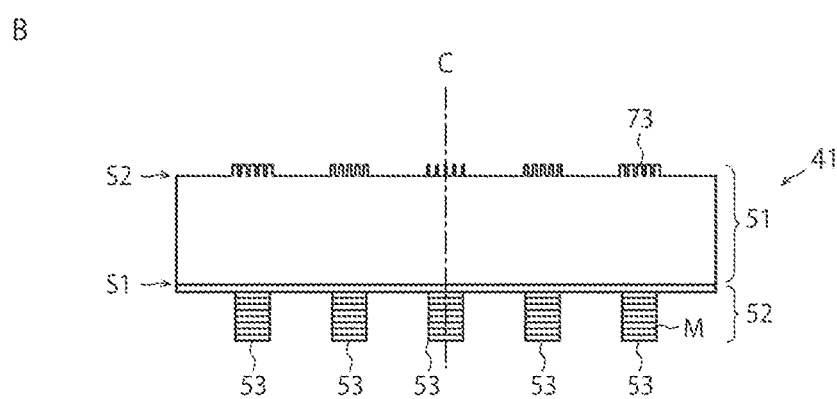

FIG. 15 is a sectional view showing a manufacturing method of the light-emitting apparatus 1 according to another modification of the first embodiment.

First, after forming the laminated film 52, the light-emitting elements 53, and the like on the front surface S1 of the substrate 51, a resist film 81 is formed on the rear surface S2 of the substrate 51 and the resist film 81 is lithographically patterned (A in FIG. 15). As a result, the resist film 81 including a plurality of resist portions P1 and openings P2 is formed on the rear surface S2 of the substrate. The resist portions P1 are formed above the light-emitting elements 53. Each resist portion P1 has a shape of a binary lens. It should be noted that five resist portions P1 shown in A in FIG. 15 include one resist portion P1 having a shape of a binary lens with a small radius of curvature, two resist portions P1 having a shape of a binary lens with a midsize radius of curvature, and two resist portions P1 having a shape of a binary lens with a large radius of curvature.

Next, the resist portions (resist pattern) P1 of the patterned resist film 81 are transferred to the substrate 51 by dry etching (B in FIG. 15). As a result, the rear surface S2 of the substrate 51 is machined by dry etching and a plurality of binary lenses 73 having a shape similar to the resist portions P1 prior to the dry etching are formed on the rear surface S2 of the substrate 51. The resist portion P1 having a shape of a binary lens with a small radius of curvature, the resist portions P1 having a shape of a binary lens with a midsize radius of curvature, and the resist portions P1 having a shape of a binary lens with a large radius of curvature have respectively changed into a binary lens 73 with a small radius of curvature, binary lenses 73 with a midsize radius of curvature, and binary lenses 73 with a large radius of curvature.

In the present embodiment, subsequently, the correcting lens 46 described earlier is arranged above the binary lenses 73 (refer to FIG. 8). As a result, the shapes of the binary lenses 73 change in accordance with the distance R from the optical center C of the correcting lens 46. The light-emitting apparatus 1 shown in FIG. 8 is manufactured in this manner.

As described above, since the binary lens 73 can be formed without performing the steps using the hard mask layer 84 and the baked resist film 82, the binary lens 73 can be more readily formed than the concave lens 71 or the convex lens 72. However, when patterning the resist film 81 using an antiquated exposure apparatus instead of a new exposure apparatus such as an immersion exposure apparatus, generally, the concave lens 71 and the convex lens 72 can be more readily formed than the binary lens 73.

It should be noted that the method shown in A in FIG. 11 to B in FIG. 12 can be replaced with other methods. Two examples of such methods will be described below.

Figure 16:
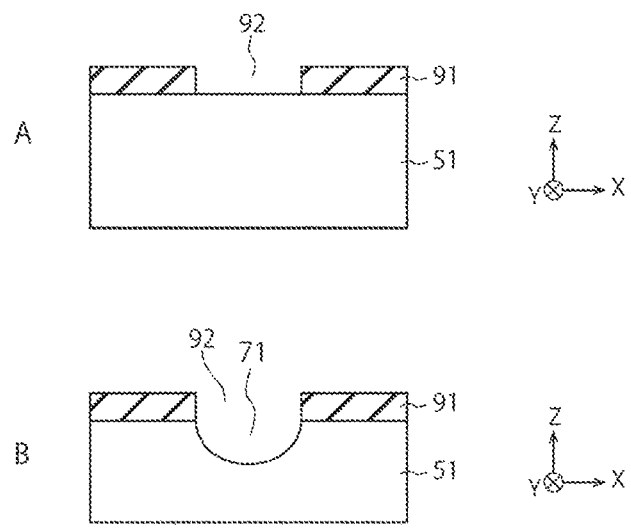
FIG. 16 is a sectional view showing a method 1 which differs from a method shown from A in FIG. 11 to B in FIG. 12.

FIG. 16 is a sectional view showing a method 1 which differs from the method shown from A in FIG. 11 to B in FIG. 12.

First, a hard mask layer 91 is formed on an upper surface (the rear surface S2) of the substrate 51 and an opening 92 is formed in the hard mask layer 91 (A in FIG. 16). The hard mask layer 91 is, for example, an $SiO_2$ layer. While a plurality of openings 92 are formed in the hard mask layer 91 according to this method, A in FIG. 16 only shows one of the openings 92.

Next, an upper surface of the hard mask layer 91 is planarized by CMP (Chemical Mechanical Polishing) (A in FIG. 16). In doing so, a phenomenon known as "dishing" occurs in which the upper surface of the substrate 51 being exposed inside the opening 92 is recessed by CMP. As a result, a concave portion or, in other words, the concave lens 71 is formed on the upper surface (the rear surface S2) of the substrate 51 inside the opening 92. More specifically, a plurality of concave lenses 71 are formed on the rear surface S2 of the substrate 51 inside the plurality of openings 92 of the hard mask layer 91.

Subsequently, the hard mask layer 91 is removed and the correcting lens 46 is arranged. The light-emitting apparatus 1 shown in FIG. 4 is manufactured in this manner.

Figure 17:
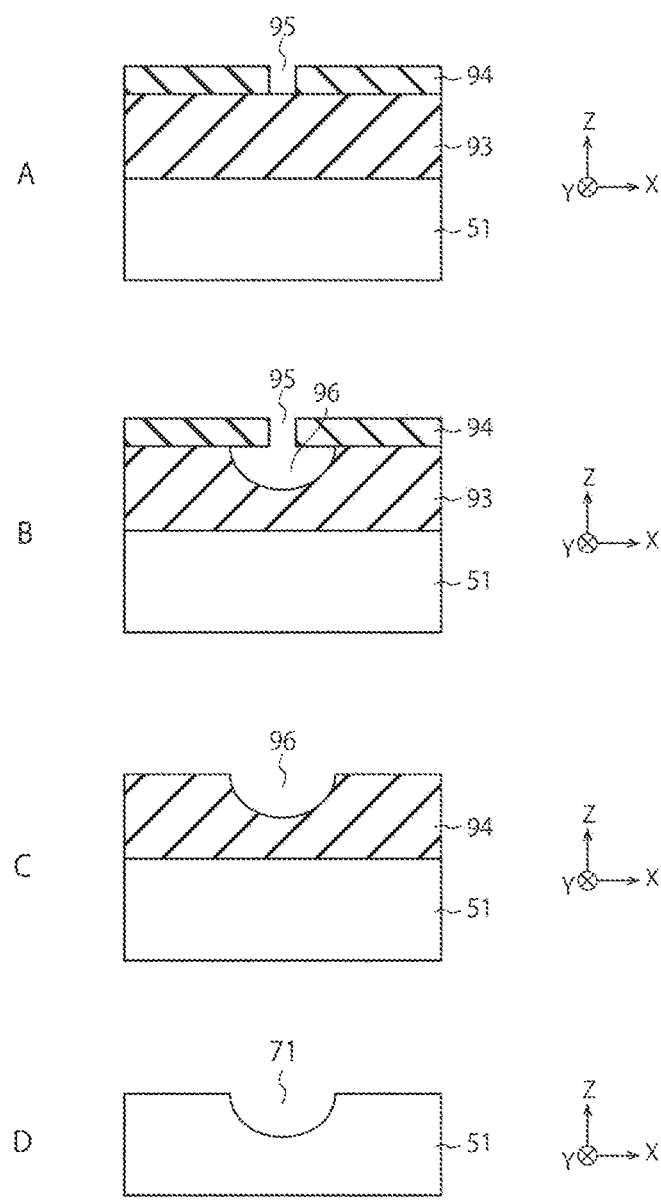
FIG. 17 is a sectional view showing a method 2 which differs from a method shown from A in FIG. 11 to B in FIG. 12.

FIG. 17 is a sectional view showing a method 2 which differs from the method shown from A in FIG. 11 to B in FIG. 12.

First, a first hard mask layer 93 is formed on the upper surface (the rear surface S2) of the substrate 51, a second hard mask layer 94 is formed on the first hard mask layer 93, and a small opening 95 is formed in the second hard mask layer 94 (A in FIG. 17). The first hard mask layer 93 is, for example, an organic film such as a carbon film. The second hard mask layer 94 is, for example, an $SiO_2$ layer. While a plurality of openings 95 are formed in the second hard mask layer 94 according to this method, A in FIG. 17 only shows one of the openings 95.

Next, the first hard mask layer 93 is machined by isotropic etching which uses the second hard mask layer 94 as a mask (B in FIG. 17). As a result, the first hard mask layer 93 exposed in the opening 95 is isotropically recessed and a concave portion 96 is formed inside the first hard mask layer 93.

Next, the second hard mask layer 94 is removed (C in FIG. 17). Next, the concave portion 96 of the first hard mask layer 93 is transferred to the substrate 51 by dry etching (D in FIG. 17). As a result, the rear surface S2 of the substrate 51 is machined by dry etching and a concave portion having a shape similar to the concave portion 96 or, in other words, the concave lens 71 is formed on the rear surface S2 of the substrate 51. More specifically, a plurality of concave lenses 71 with a similar shape to the plurality of concave portions 96 are formed on the rear surface S2 of the substrate 51.

Subsequently, the correcting lens 46 is arranged above the substrate 51. The light-emitting apparatus 1 shown in FIG. 4 is manufactured in this manner.

As described above, the light-emitting apparatus 1 according to the present embodiment includes the plurality of concave lenses 71 (or convex lenses 72 or binary lenses 73) above the plurality of light-emitting elements 53 and includes the correcting lens 46 above the concave lenses 71, and a shape or an arrangement of the concave lenses 71 changes in accordance with the distance R from the optical center C of the correcting lens 46. Therefore, according to the present embodiment, light from the plurality of light-emitting elements 53 can be suitably shaped such as being able to collimate light incident on the correcting lens 46 via the plurality of concave lenses 71 from the plurality of light-emitting elements 53 while reducing an aberration of the correcting lens 46. Accordingly, for example, a high-resolution imaging apparatus 2 can be realized.

While the light-emitting apparatus 1 according to the present embodiment is used as a light source of a ranging apparatus, the light-emitting apparatus 1 may be used in other aspects. For example, the light-emitting apparatus 1 according to the present embodiment may be used as a light source of an optical device such as a printer or as a lighting apparatus.

While embodiments of the present disclosure have been described above, various modifications of the embodiments may be implemented without deviating from the gist of the present disclosure. For example, two or more embodiments may be combined and implemented.

The present disclosure can also be configured as follows.

(1)
A light-emitting apparatus, including:
a substrate;
a plurality of light-emitting elements which are provided on a side of a first surface of the substrate;
a plurality of first lenses which are provided on a side of a second surface of the substrate and on which light emitted from the plurality of light-emitting elements is incident; and
a second lens on which light having passed through the plurality of first lenses is incident, wherein
a shape or an arrangement of the plurality of first lenses changes in accordance with a distance from an optical center of the second lens.

(2)
The light-emitting apparatus according to (1), wherein the plurality of first lenses are provided on the second surface of the substrate as a part of the substrate.

(3)
The light-emitting apparatus according to (1), wherein the plurality of first lenses include at least any of a concave lens, a convex lens, and a binary lens.

(4)
The light-emitting apparatus according to (1), wherein a radius of curvature of the plurality of first lenses is increased or reduced in accordance with a distance from the optical center of the second lens.

(5)
The light-emitting apparatus according to (1), wherein a pitch between the plurality of first lenses is increased or reduced in accordance with a distance from the optical center of the second lens.

(6)
The light-emitting apparatus according to (1), further including an antireflective film provided on a surface of the plurality of first lenses.

(7)
The light-emitting apparatus according to (1), further including an inorganic film provided on the second surface of the substrate between the plurality of first lenses.

(8)
The light-emitting apparatus according to (1), wherein the substrate is a semiconductor substrate containing gallium (Ga) and arsenic (As).

(9)
The light-emitting apparatus according to (1), wherein light emitted from the plurality of light-emitting elements is transmitted inside the substrate from the first surface to the second surface and incident on the plurality of first lenses.

(10)
The light-emitting apparatus according to (1), wherein the first surface of the substrate is a front surface of the substrate and the second surface of the substrate is a rear surface of the substrate.

(11)
The light-emitting apparatus according to (1), further including a drive apparatus which is provided on the side of the first surface of the substrate via the plurality of light-emitting elements and which is configured to drive the plurality of light-emitting elements.

(12)
The light-emitting apparatus according to (1), wherein the drive apparatus is configured to drive the plurality of light-emitting elements on an individual basis.

(13)
A manufacturing method of a light-emitting apparatus including the steps of; forming a plurality of light-emitting elements on a side of a first surface of a substrate;
forming a plurality of first lenses on which light emitted from the plurality of light-emitting elements is incident on a side of a second surface of the substrate; and
arranging a second lens on which light having passed through the plurality of first lenses is incident, wherein
a shape or an arrangement of the plurality of first lenses is set so as to change in accordance with a distance from an optical center of the second lens.

(14)
The manufacturing method of a light-emitting apparatus according to (1), wherein the plurality of first lenses is formed as a part of the substrate by machining the second surface of the substrate.

(15) The manufacturing method of a light-emitting apparatus according to (1), wherein the plurality of first lenses include at least any of a concave lens, a convex lens, and a binary lens.

(16) The manufacturing method of a light-emitting apparatus according to (1), wherein the concave lens is formed by forming a convex portion on the second surface of the substrate and machining the convex portion into a concave portion.

(17) The manufacturing method of a light-emitting apparatus according to (1), wherein the convex portion is formed by forming a resist film on the second surface of the substrate, patterning the resist film, baking the patterned resist film, and transferring a pattern of the baked resist film onto the substrate.

(18) The manufacturing method of a light-emitting apparatus according to (1), wherein the concave portion is formed by forming a mask layer on the convex portion, exposing the convex portion from the mask layer by etching the mask layer, and further etching the mask layer together with the convex portion.

(19) The manufacturing method of a light-emitting apparatus according to (1), wherein the convex lens is formed by forming a convex portion on the second surface of the substrate.

(20) The manufacturing method of a light-emitting apparatus according to (1), wherein the convex portion is formed by forming a resist film on the second surface of the substrate, patterning the resist film, baking the patterned resist film, and transferring a pattern of the baked resist film onto the substrate.

REFERENCE SIGNS LIST

1 Light-emitting apparatus
2 Imaging apparatus
3 Control apparatus
11 Light-emitting unit
12 Drive circuit
13 Power source circuit
14 Light-emitting side optical system
21 Image sensor
22 Image processing unit
23 Imaging-side optical system
31 Ranging unit
41 LD chip
42 LDD substrate
43 Mounting substrate
44 Heat dissipation substrate
45 Correcting lens holding unit
46 Correcting lens
47 Wiring
48 Bump
51 Substrate
52 Laminated film
53 Light-emitting element
54 Anode electrode
55 Cathode electrode
61 Substrate
62 Connection pad
71 Concave lens
72 Convex lens
73 Binary lens
74 Antireflective film
75 Inorganic film
81 Resist film
82 Resist film
83 Convex portion
84 Hard mask layer
85 Concave portion
91 Hard mask layer
92 Opening
93 First hard mask layer
94 Second hard mask layer
95 Opening
96 Concave portion

What is claimed is:

1. A light-emitting apparatus, comprising:
a substrate;
a plurality of light-emitting elements which are provided on a side of a first surface of the substrate;
a plurality of first lenses which are provided on a side of a second surface of the substrate and on which light emitted from the plurality of light-emitting elements is incident; and
a second lens on which light having passed through the plurality of first lenses is incident,
wherein a shape or an arrangement of the plurality of first lenses changes in accordance with a distance from an optical center of the second lens, and wherein a radius of curvature of the plurality of first lenses is increased or reduced in accordance with a distance from the optical center of the second lens.

2. The light-emitting apparatus according to claim 1, wherein the plurality of first lenses are provided on the second surface of the substrate as a part of the substrate.

3. The light-emitting apparatus according to claim 2, further comprising an inorganic film provided on the second surface of the substrate between the plurality of first lenses.

4. The light-emitting apparatus according to claim 1, wherein the plurality of first lenses include at least any of a concave lens, a convex lens, and a binary lens.

5. The light-emitting apparatus according to claim 1, further comprising an antireflective film provided on a surface of the plurality of first lenses.

6. The light-emitting apparatus according to claim 1, wherein the substrate is a semiconductor substrate containing gallium (Ga) and arsenic (As).

7. The light-emitting apparatus according to claim 1, wherein light emitted from the plurality of light-emitting elements is transmitted inside the substrate from the first surface to the second surface and incident on the plurality of first lenses.

8. The light-emitting apparatus according to claim 1, wherein the first surface of the substrate is a front surface of the substrate and the second surface of the substrate is a rear surface of the substrate.

9. The light-emitting apparatus according to claim 1, further comprising a drive apparatus which is provided on the side of the first surface of the substrate via the plurality of light-emitting elements and which is configured to drive the plurality of light-emitting elements.

10. The light-emitting apparatus according to claim 9, wherein the drive apparatus is configured to drive the plurality of light-emitting elements on an individual basis.

11. A light-emitting apparatus, comprising:
a substrate;
a plurality of light-emitting elements which are provided on a side of a first surface of the substrate;
a plurality of first lenses which are provided on a side of a second surface of the substrate and on which light emitted from the plurality of light-emitting elements is incident; and
a second lens on which light having passed through the plurality of first lenses is incident,
wherein a shape or an arrangement of the plurality of first lenses changes in accordance with a distance from an optical center of the second lens, and
wherein a pitch between the plurality of first lenses is increased or reduced in accordance with a distance from the optical center of the second lens.

12. The light-emitting apparatus according to claim 11, wherein the plurality of first lenses are provided on the second surface of the substrate as a part of the substrate.

13. The light-emitting apparatus according to claim 12, further comprising an inorganic film provided on the second surface of the substrate between the plurality of first lenses.

14. The light-emitting apparatus according to claim 11, wherein the plurality of first lenses include at least any of a concave lens, a convex lens, and a binary lens.

15. The light-emitting apparatus according to claim 11, further comprising an antireflective film provided on a surface of the plurality of first lenses.

16. The light-emitting apparatus according to claim 11, wherein the substrate is a semiconductor substrate containing gallium (Ga) and arsenic (As).

17. The light-emitting apparatus according to claim 11, wherein light emitted from the plurality of light-emitting elements is transmitted inside the substrate from the first surface to the second surface and incident on the plurality of first lenses.

18. A manufacturing method of a light-emitting apparatus comprising the steps of:
forming a plurality of light-emitting elements on a side of a first surface of a substrate;
forming a plurality of first lenses on which light emitted from the plurality of light-emitting elements is incident on a side of a second surface of the substrate; and
arranging a second lens on which light having passed through the plurality of first lenses is incident, wherein
a shape or an arrangement of the plurality of first lenses is set so as to change in accordance with a distance from an optical center of the second lens,
wherein the plurality of first lenses include at least any of a concave lens, a convex lens, and a binary lens, and
wherein the concave lens is formed by forming a convex portion on the second surface of the substrate and machining the convex portion into a concave portion.

19. The manufacturing method of a light-emitting apparatus according to claim 18, wherein the convex portion is formed by forming a resist film on the second surface of the substrate, patterning the resist film, baking the patterned resist film, and transferring a pattern of the baked resist film onto the substrate.

20. The manufacturing method of a light-emitting apparatus according to claim 18, wherein the concave portion is formed by forming a mask layer on the convex portion, exposing the convex portion from the mask layer by etching the mask layer, and further etching the mask layer together with the convex portion.

* * * * *